(12) United States Patent
Grebenshikov et al.

(10) Patent No.: US 11,748,079 B2
(45) Date of Patent: Sep. 5, 2023

(54) TECHNOLOGIES FOR CREATING AND DISTRIBUTING INTEGRATION CONNECTORS IN A CLOUD SERVICE BROKERAGE SYSTEM

(71) Applicant: Ingram Micro Inc., Irvine, CA (US)

(72) Inventors: Vladimir Grebenshikov, Moscow (RU); Maxim Kuzkin, Irvine, CA (US); Alexander Khaerov, Moscow (RU)

(73) Assignee: CloudBlue LLC, Irvine, CA (US)

( * ) Notice: Subject to any disclaimer, the term of this patent is extended or adjusted under 35 U.S.C. 154(b) by 0 days.

(21) Appl. No.: 16/889,451

(22) Filed: Jun. 1, 2020

(65) Prior Publication Data

US 2021/0034345 A1  Feb. 4, 2021

Related U.S. Application Data

(63) Continuation of application No. 15/953,104, filed on Apr. 13, 2018, now abandoned.
(Continued)

(51) Int. Cl.
*G06F 8/60* (2018.01)
*G06F 9/54* (2006.01)
*G06Q 30/0601* (2023.01)

(52) U.S. Cl.
CPC .............. *G06F 8/60* (2013.01); *G06F 9/547* (2013.01); *G06Q 30/0641* (2013.01)

(58) Field of Classification Search
CPC ........ G06F 8/60; G06F 9/547; G06Q 30/0641
(Continued)

(56) References Cited

U.S. PATENT DOCUMENTS

| 8,843,997 | B1 | 9/2014 | Hare | |
|---|---|---|---|---|
| 2005/0268282 | A1* | 12/2005 | Laird | ........................ G06F 8/71 717/121 |

(Continued)

FOREIGN PATENT DOCUMENTS

| WO | 2017023268 A1 | 9/2017 |
|---|---|---|
| WO | 2017023276 A1 | 9/2017 |

OTHER PUBLICATIONS

International Search Report and Written Opinion dated Jun. 6, 2018 in International Application No. PCT/US2018/027596, (7 pages).

*Primary Examiner* — Chat C Do
*Assistant Examiner* — Bradford F Wheaton
(74) *Attorney, Agent, or Firm* — Ice Miller LLP

(57) ABSTRACT

Technologies for creating and distributing integration connectors in cloud service brokerage systems include a developer portal computing device communicatively coupled to a connector hub of a marketplace computing. The developer portal computing device is configured to receive information from a developer via a developer UI portal of a developer portal computing device. Such information includes connector descriptor information for a connector associated with a cloud service and one or more resource types of the connector. The developer portal computing device is further configured to build, via a connector builder of the developer portal computing device, the connector as a function of the connector descriptor information and the one or more resource types, generate a connector package for the built connector, and transmit the generated connector package to a connector hub of a cloud service marketplace computing device, wherein the connector package is usable to create one or more instances of the connector. Additional embodiments are described herein.

8 Claims, 9 Drawing Sheets

Related U.S. Application Data

(60) Provisional application No. 62/485,665, filed on Apr. 14, 2017.

(58) Field of Classification Search
USPC .......................................................... 717/177
See application file for complete search history.

(56) References Cited

U.S. PATENT DOCUMENTS

| | | |
|---|---|---|
| 2006/0265355 A1 | 11/2006 | Taylor et al. |
| 2007/0239858 A1 | 10/2007 | Banerji |
| 2007/0300237 A1 | 12/2007 | Neil et al. |
| 2009/0060293 A1* | 3/2009 | Nagao ................ G06K 9/00221 382/118 |
| 2012/0147894 A1* | 6/2012 | Mulligan ............ H04L 41/5048 370/395.53 |
| 2013/0282565 A1* | 10/2013 | Barta ...................... G06Q 20/34 705/39 |
| 2014/0006580 A1* | 1/2014 | Raghu ................ G06F 9/45558 709/223 |
| 2014/0365350 A1* | 12/2014 | Shvarts .................. G06Q 40/00 705/35 |
| 2016/0019636 A1 | 1/2016 | Adapalli et al. |
| 2016/0124742 A1 | 5/2016 | Rangasamy et al. |
| 2016/0149970 A1* | 5/2016 | Jacquemot ........... H04L 65/403 709/204 |
| 2016/0198016 A1* | 7/2016 | Tiger .................. H04L 67/2852 709/213 |
| 2016/0260157 A1* | 9/2016 | Krook ..................... H04L 67/16 |

* cited by examiner

TECHNOLOGIES FOR CREATING AND DISTRIBUTING INTEGRATION CONNECTORS IN A CLOUD SERVICE BROKERAGE SYSTEM

CROSS-REFERENCE TO RELATED APPLICATION

This application is a continuation of U.S. patent application Ser. No. 15/953,104, which was filed on Apr. 13, 2018, which claims the benefit of U.S. Provisional Application No. 62/485,665, filed on Apr. 14, 2017, the contents of which are incorporated by reference herein in their entireties.

TECHNICAL FIELD OF THE DISCLOSED EMBODIMENTS

The presently disclosed embodiments generally relate to cloud service brokering, and more particularly, to technologies for creating and distributing integration connectors in cloud service brokerage systems.

BACKGROUND OF THE DISCLOSED EMBODIMENTS

Independent software vendors (ISVs) develop and sell software applications which are typically designed to run on one or more computer hardware or operating system platforms. Such software applications range from basic utility or productivity enhancing application to business process application for enterprises (e.g., customer relationship management (CRM), enterprise resource planning (ERP), automation tools, etc.). As cloud computing has become more pervasive, one such method of delivering software has been via the cloud using a software as a service (SaaS) based model. Using this delivery method, the ISVs may sell their software applications, or subscriptions to their software applications, through a public cloud or cloud marketplace.

While the cloud marketplace provides an online storefront for customer access to cloud-based services and software applications, a cloud service broker may be used to facilitate the transaction between the ISV and an end user, reseller, retailer, etc., such as by using a plug-in or API connector for each cloud service. In traditional cloud service broker implementations, each cloud service broker typically has a contract with each ISV for each cloud service which provides the cloud service broker access to the platform and/or infrastructure, which may be accessed (e.g., via a portal) for creating and managing API connectors, thereby enabling their services to be purchased, provisioned, and executed in the cloud.

Typically, such API connectors are launched from the cloud service broker's side, either on-premises (i.e., provider-side) or in the cloud (e.g., under the account of the cloud service broker). As such, each cloud service broker platform instance has its own API connector for each service the cloud service broker platform is tuned to provide. However, such manual implementations generally require a multitude of API methods and few user interface integration points, which can result in longer release times for ISVs to integrate their services onto the respective cloud service broker platform. There is, therefore, a need for creating and distributing integration connectors in cloud service brokerage systems.

SUMMARY OF THE DISCLOSED EMBODIMENTS

In one aspect, a method for creating and distributing cloud service integration connectors in a cloud service brokerage system. The method includes receiving, from a developer via a developer UI portal of a developer portal computing device, connector descriptor information for a connector associated with a cloud service; receiving, from the developer via the developer UI portal, one or more resource types of the connector; building, via a connector builder of the developer portal computing device, the connector as a function of the connector descriptor information and the one or more resource types; generating, by the connector builder, a connector package for the built connector; and transmitting, by the connector builder, the generated connector package to a connector hub of a cloud service marketplace computing device, wherein the connector package is usable to create one or more instances of the connector.

In some embodiments, the method further includes analyzing, by an expert system of the developer portal computing device, whether a previous version of the connector associated with the cloud service has been published; determining, by the expert system and subsequent to a determination that the previous version of the connector has been published, a coincidence level between the connector and the previous version of the connector; comparing, by the expert system, the coincidence level against a coincidence level threshold; and relating, by the expert system, the connector with the previous version of the connector as a new version of the previous version of the connector.

In some embodiments, the method additionally includes analyzing, via the expert system of the developer portal computing device, whether another service should be related to the connector; identifying, by the expert system, whether one or more other services could be related to the connector; and relating, by the expert system and subsequent to having identified the one or more other services could be related to the connector, the one or more other services.

In some embodiments, the method further includes receiving, from the developer via the developer UI portal, an identifier associated with a connector skeleton from a connector skeleton database of the developer portal computing device, wherein the connector skeleton is usable to generate a framework for creating the connector, and wherein receiving the one or more resource types of the connector comprises receiving the one or more resource types of the connector based on the connector skeleton.

In some embodiments, receiving the connector descriptor information includes receiving a title of the service, a type of the service, an icon associated with the service, and one or more service provider instructions. Additionally or alternatively, in some embodiments, the method further includes determining, by the connector builder, one or more differences between the connector and the previous version of the connector; and generating, by the connector builder, one or more upgrade instructions as a function of the determined one or more differences, wherein generating the connector package comprises generating the connector package as a function of the one or more upgrade instructions.

BRIEF DESCRIPTION OF DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

Figure 1:
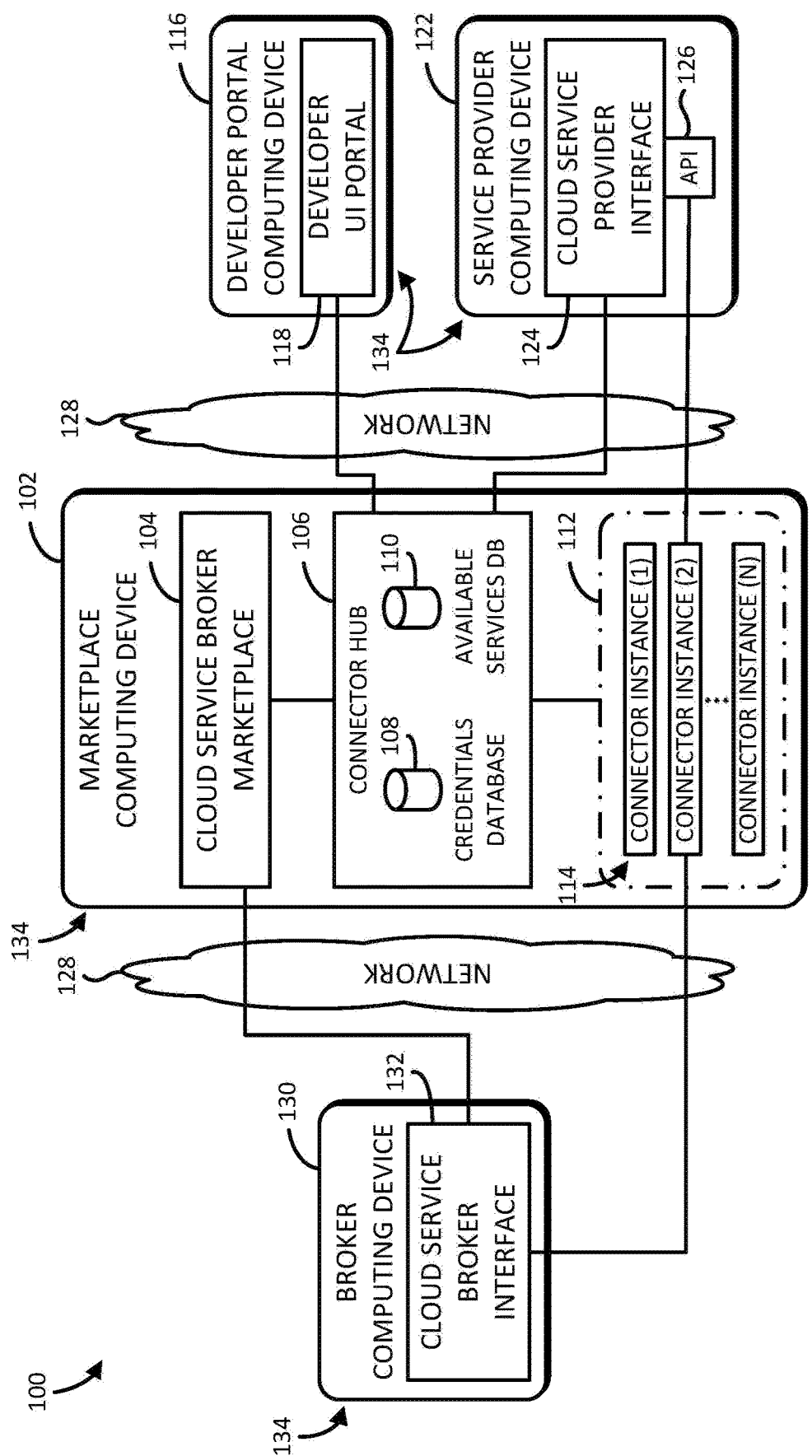
FIG. 1 is a block diagram of an illustrative embodiment of a cloud service marketplace and brokerage system for creating and distributing integration connectors in cloud service brokerage systems that includes a broker computing device, a service provider computing device, and a developer portal computing device, each of which is communicatively coupled to a marketplace computing device.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 illustrates a cloud service marketplace and brokering system 100 for creating and distributing integration connectors. The cloud service marketplace and brokering system 100 includes a developer portal computing device 116, a service provider computing device 122, and a broker computing device 130, each of which are communicatively coupled to a marketplace computing device 102 (e.g., via a network 128). In use, a cloud service application developer/programmer associated with a cloud service provider develops an application programming interface (API) (see, e.g., the API 126 of FIG. 1) and an API connector for one or more cloud services.

To develop the API connector, the developer uses a developer portal (e.g., the developer user interface (UI) portal 118 of the developer portal computing device 116) for a particular service to be offered for sale in a cloud service marketplace (e.g., via the cloud service broker marketplace 104 of the marketplace computing device 102). It should be appreciated that the developer may access the developer UI portal 118 via an endpoint computing device (not shown) communicatively coupled (e.g., via the network 128) to the developer portal computing device 116.

The API connector may be in the form of source code usable to create a replicated instance of that API connector (see, e.g., a corresponding API connector instance 114 of the connector factory 112 of FIG. 1), which is usable to communicate with its respective API 126. Accordingly, each API 126 is configured to receive commands from the cloud service (e.g., via the cloud service provider interface 124 of the service provider computing device 122) and transmit the received commands to the corresponding API connector instance 114 to which the API 126 is connected, and vice versa.

The developer portal is configured to receive input from the developer that is usable to define the major components of the connector package, such as a model (e.g., an explanation of the business model for application objects), a user interface(s) supporting user interactions, and a backend (e.g., a representational state transfer (REST) service for process provisioning, management, request monitoring, etc.) for the connector. It should be appreciated that the developer portal may be configured to receive additional information associated with the connector, such as cloud service address, default settings, pricing information, sales templates, an identifier of the cloud service, etc.

The developer portal is additionally configured to, as will be described in further detail below, produce a connector package, test the produced connector package, and publish the tested connector package to a connectors catalogue (e.g., the available services database 110 of the connector hub 106 of the marketplace computing device 102). Subsequent to the development phase, the connector package may then proceed to the production phase, in which the connector can be deployed to a cloud service broker (e.g., by way of the cloud service broker marketplace 104 via the cloud service broker interface 132 of the broker computing device 130).

The marketplace computing device 102 is configured to manage licenses to various cloud services between cloud service providers and cloud service brokers. In an illustrative example, a cloud service provider (e.g., an independent software vendor (ISV)) contracts with a controlling entity of the cloud service marketplace 102 to facilitate the sale of a license to an end-user. The license may then allow that end-user, or other end-user(s) associated therewith, certain access to the cloud service provider's cloud services (e.g., cloud-based software as a service (SaaS) application(s)).

To do so, the illustrative marketplace computing device 102 includes a connector hub 106 that is configured to store packaged connectors generated via the developers UI portal 118 (e.g., in the available services database 110) and to establish provisioning channels for connectors 114 of a connector factory 112 between a cloud service provider interface 124 of the service provider computing device 122 and a cloud service broker interface 132 of the broker computing device 130. Accordingly, a cloud service broker may then sell licenses for cloud services associated with the packaged connectors to end-users (e.g., a customer, a broker, a reseller, etc.) via their respective cloud service broker interface 132.

The connector hub 106 is additionally configured to generate provisioning channel credentials for each connector 114 (e.g., broker credentials and/or cloud service provider credentials, such as may be stored in the credentials database 108). It should be appreciated that the provisioning channel credentials may be any type of information (e.g., cryptographic keys or other arbitrary data) that is usable to authenticate a secure communication channel between two entities using the provisioning channel credentials.

As shown in the illustrative cloud service marketplace and brokering system 100, each of the marketplace computing device 102, the developer portal computing device 116, the service provider computing device 122, and the broker computing device 130 are embodied as computing devices 134. Accordingly, it should be appreciated that each of the respective computing devices 134 may be embodied as any type of compute and/or storage device capable of performing the functions described herein. Additionally, it should be further appreciated that each of the respective computing devices 134 may be comprised of more than one computing device 134. For example, one or more of the computing devices 134 may be embodied as one or more servers (e.g., stand-alone, rack-mounted, etc.) and/or combination of compute blades and data storage devices (e.g., of a storage area network (SAN)) in a cloud architected network or data center, while one or more of the other computing devices 134 may be embodied as one or more desktop computers, mobile computing devices (e.g., smartphones, wearables, tablets, laptops, notebooks, etc.), or any other type of "smart" or otherwise Internet-connected devices.

Figure 2:
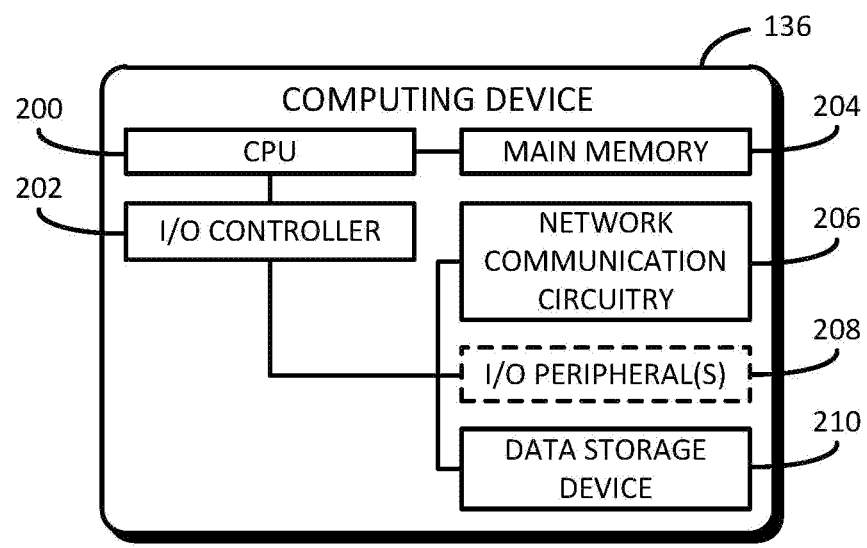
FIG. 2 is a block diagram of an illustrative embodiment of one of the computing devices of the cloud service broker marketplace of the marketplace computing device of FIG. 1.

Referring now to FIG. 2, an illustrative embodiment of a computing device 134 representative of one or more of the marketplace computing device 102, the developer portal computing device 116, the service provider computing device 122, and the broker computing device 130 is shown. The illustrative computing device 134 includes a central processing unit (CPU) 200, an input/output (I/O) controller 202, a memory 204, a network communication circuitry 206, and a data storage device 210, as well as, in some embodiments, one or more I/O peripherals 208. In some embodiments, one or more of the illustrative components may be combined on a single system-on-a-chip (SoC) on a single integrated circuit (IC). It should be appreciated that alternative embodiments may include additional, fewer, and/or alternative components to those of the illustrative computing device 134, such as a graphics processing unit (GPU), a power supply, etc., which are not shown to preserve clarity of the description. It should be further appreciated that the type of storage/compute components of the respective computing device 134 may be predicated upon the type and intended use of the respective computing device 134.

The CPU 200, or processor, may be embodied as any type of hardware or combination of circuitry capable of processing data. Accordingly, the CPU 200 may include one processing core (not shown) in a single-core processor architecture, or multiple processing cores in a multi-core processor architecture. Irrespective of the number of processing cores, the CPU 200 is capable of reading and executing program instructions. In some embodiments, the CPU 200 may include cache memory (not shown) that may be integrated directly with the CPU 200 or placed on a separate chip with a separate interconnect to the CPU 200. It should be appreciated that, in some embodiments, pipeline logic may be used to perform software and/or hardware operations (e.g., network traffic processing operations), rather than commands issued to/from the CPU 200.

The I/O controller 202, or I/O interface, may be embodied as any type of computer hardware or combination of circuitry capable of interfacing between input/output devices and the computing device 134. Illustratively, the I/O controller 202 is configured to receive input/output requests from the CPU 200, and send control signals to the respective input/output devices, thereby managing the data flow to/from the computing device 134.

The memory 204 may be embodied as any type of computer hardware or combination of circuitry capable of holding data and instructions for processing. Such memory 204 may be referred to as main or primary memory. It should be appreciated that, in some embodiments, one or more components of the computing device 134 may have direct access to memory, such that certain data may be stored via direct memory access (DMA) independently of the CPU 200.

The network communication circuitry 206 may be embodied as any type of computer hardware or combination of circuitry capable of managing network interfacing communications (e.g., messages, datagrams, packets, etc.) via wireless and/or wired communication modes. Accordingly, in some embodiments, the network communication circuitry 206 may include a network interface controller (NIC) capable of being configured to connect the computing device 134 to a computer network (e.g., the network 128), as well as other computing devices of the cloud service marketplace and brokering system 100.

The one or more I/O peripherals 208 may be embodied as any auxiliary device configured to connect to and communicate with the computing device 134. For example, the I/O peripherals 208 may include, but are not limited to, a mouse, a keyboard, a monitor, a touchscreen, a printer, a scanner, a microphone, a speaker, etc. Accordingly, it should be appreciated that some I/O devices are capable of one function (i.e., input or output), or both functions (i.e., input and output).

In some embodiments, the I/O peripherals 208 may be connected to the computing device 134 via a cable (e.g., a ribbon cable, a wire, a universal serial bus (USB) cable, a high-definition multimedia interface (HDMI) cable, etc.) of the computing device 134. In such embodiments, the cable is connected to a corresponding port (not shown) of the computing device 134 for which the communications made therebetween can be managed by the I/O controller 202. In alternative embodiments, the I/O peripherals 208 may be connected to the computing device 134 via a wireless mode of communication (e.g., Bluetooth®, Wi-Fi®, etc.) which can be managed by the network communication circuitry 206.

The data storage device 210 may be embodied as any type of computer hardware capable of the non-volatile storage of data (e.g., semiconductor storage media, magnetic storage media, optical storage media, etc.). Such data storage devices 210 are commonly referred to as auxiliary or secondary storage, and are typically used to store a large amount of data relative to the memory 204 described above.

Referring back to FIG. 1, the illustrative cloud service marketplace system 100 includes a network 128 that is usable for the other computing devices 134 (i.e., the developer portal computing device 116, the service provider computing device 122, and the broker computing device 130) to communicate with the marketplace computing device 102. The network 128 may be implemented as any type of wired and/or wireless network, including a local area network (LAN), a wide area network (WAN), a metropolitan area network (MAN), a global network (the Internet), etc., utilizing any wired and/or wireless communication technologies and network communication transmission protocols. Accordingly, the network 128 may include one or more communicatively coupled network computing devices (not shown) for facilitating the flow and/or processing of network communication traffic via a series of wired and/or wireless interconnects. Such network computing devices may include, but are not limited to, one or more access points, routers, switches, servers, compute devices, storage devices, etc.

For example, one or more of such network computing devices may be configured to couple one or more of the marketing computing device 102, the developer portal computing device 116, the service provider computing device 122, and/or the broker computing device 130 to the network 128 in a LAN configuration using wired (e.g., Ethernet, token ring, etc.) and/or a WLAN configuration using wireless (e.g., Bluetooth®, Wi-Fi®, wireless broadband, ZigBee®, etc.) communication technologies and associated protocols. In furtherance of the example, a LAN configuration may be coupled (e.g., via coaxial, mobile telephony, fiber, etc.) to one or more larger area networks (e.g., WANs, metropolitan area networks (MANs), the Internet, etc.) via additional network computing devices of the network 128. It should be appreciated that one or more of the network computing devices and/or network configurations may be virtualized (e.g., a virtual switch, a virtual LAN, etc.).

As described previously, the developer portal computing device 116 includes a developer UI portal, the service provider computing device 122 includes a cloud service provider interface 124, and the illustrative broker computing device 130 includes a cloud service broker interface 132. Each of the developer UI portal 118, the cloud service provider interface 124, and the cloud service broker interface 132 may be embodied as any combination of software, hardware, firmware, and circuitry capable of performing the functions described herein. In some embodiments, one or more of the developer UI portal 118, the cloud service provider interface 124, and the cloud service broker interface 132 may be configured to render information (e.g., via a graphical UI, command line interface, etc.) to a display of their respective computing device 134. In such embodiments, the developer UI portal 118, the cloud service provider interface 124, and/or the cloud service broker interface 132 may be configured to relay inputs received from a user to login, configure the respective interface, or manipulate information (e.g., settings) associated therewith.

Figure 3:
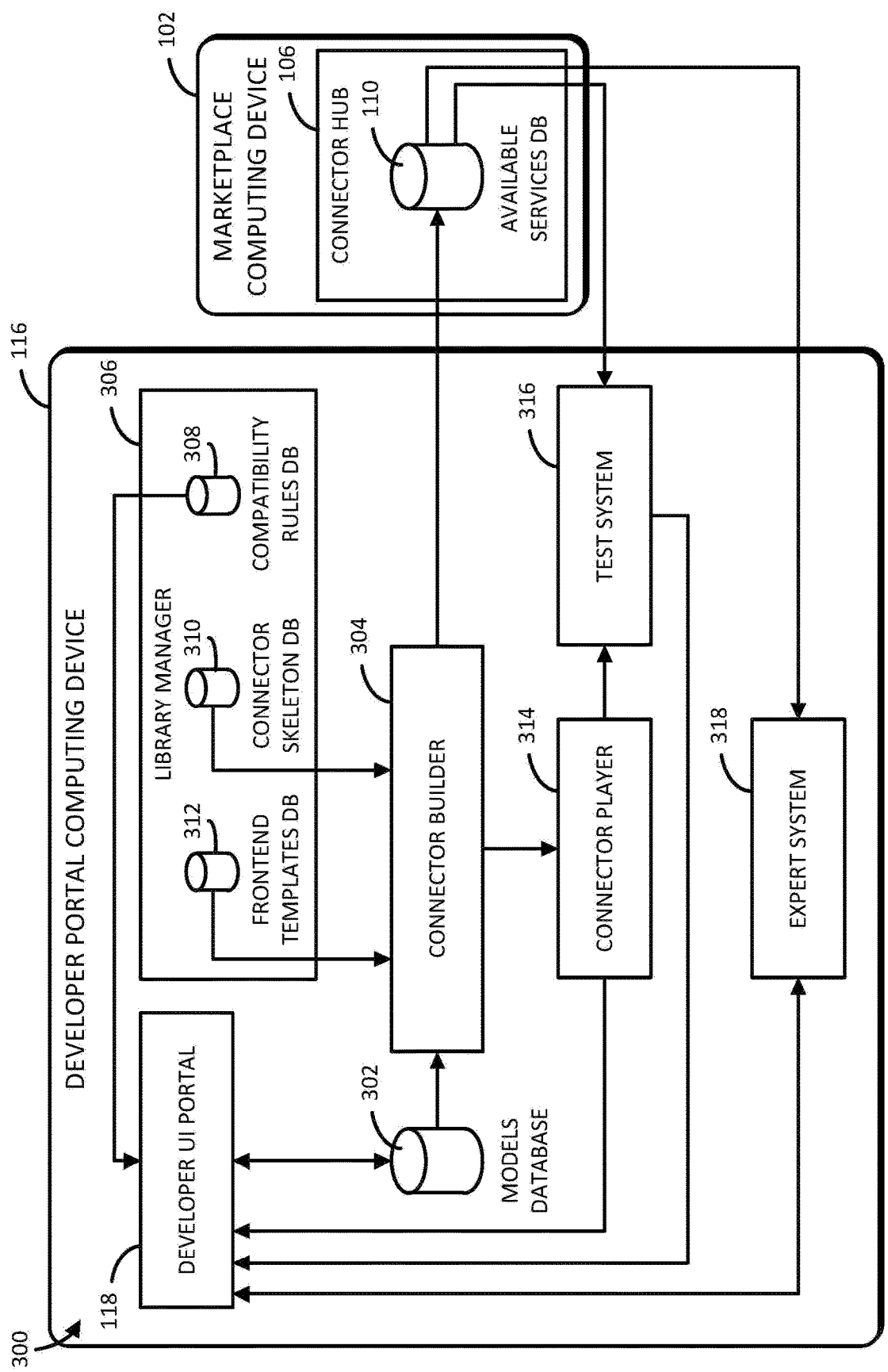
FIG. 3 is a block diagram of an illustrative environment of the developer portal computing device of FIG. 1.

Referring now to FIG. 3, an illustrative environment 300 of the developer portal computing device 116 is shown. The illustrative environment 300 includes a connector builder 304, a connector player 314, a test system 316, and an expert system 318, as well as the developer UI portal 118 of FIG. 1. In some embodiments, one or more of the developer UI portal 118, the connector builder 304, the connector player 314, the test system 316, and the expert system 318 may include one or more computer-readable medium (e.g., the memory 204, the data storage device 210, and/or any other media storage device) having instructions stored thereon and one or more processors (e.g., the CPU 200) coupled with the one or more computer-readable medium and configured to execute instructions to perform the functions described herein. Additionally, the illustrative environment 300 includes a models database 302 and a library manager 306, each of which will be described in further detail below.

As described previously, the developer UI portal 118 may be embodied as any type of firmware, hardware, software, circuitry, or combination thereof capable of performing the functions described herein. Additionally, each of the connector builder 304, the connector player 314, the test system 316, and the expert system 318 may also be embodied as any type of firmware, hardware, software, circuitry, or combination thereof capable of performing the respective functions described herein.

As also described previously, the developer UI portal 118 is configured to provide an interface to a developer for generating a packaged API connector for a cloud service. To do so, the developer UI portal 118 is configured to communicate with a developer (e.g., via hyper-text transfer protocol (HTTP) requests/responses) and interface with the various components and storage medium of the environment 300.

For example, the developer UI portal 118 is configured to communicate with the developer to receive information (i.e., connector description information) usable to package an API connector developed by the developer. As described previously, the API connector is usable to generate instances of the connector which enable the interface between the cloud service broker and the cloud service provider. As such, the connector description information may include any information related to the API connector that can be used for creating an instance of the API connector. For example, the connector description information may include, but is not limited to, UI information (e.g., a title of the service, one or more icons, etc.), resource model information (e.g., service(s) provided, such as disk space, mailboxes, domains, etc.), credentials for establishing the provisioning channel, service plan information (e.g., billing rules for the broker/provider), resource information. The connector description information may be stored in the models database 302.

It should be appreciated that the developer may modify any portion of the connector description information (e.g., as may be stored in the models database 302) via the developer UI portal 118. To do so, the developer UI portal 118 is configured to provide one or more visual interfaces usable by the developer to generate a model for the connector and/or publish the connector (e.g., via the connector builder 304), run one or more tests on a test system against the developed connector (e.g., via the connector player 314 and the test system 316), and verify the connector against one or more compatibility rules (e.g., via the expert system 318) to ensure backward compatibility for upgrades/changes made to a connector.

The models database 302 is configured to store a model for each connector. The model may include any information usable to define or otherwise package the connector, such as UI labels (e.g., name, description, etc.), visual materials (e.g., icons, screenshots, styles, etc.), UI extensions (e.g., descriptions how to plug UI elements into existing applications), definitions of business objects supported by the connector (e.g., user, mailbox, spam filtering rule, etc.). It should be appreciated that, in some embodiments, at least a portion of the UI extensions may be defined as HTML pages, and include relevant JavaScript, CSS, images, etc., as well as a description for plugging the UI elements into the UI structure for each applicable page. Additionally, the model information may include, for every object supported by the connector, one or more properties (e.g., type, description, label, default value, etc.), one or more relations (i.e., how the object(s) are connected with other object(s) of the service domain model and the cardinality of the relation(s)), and/or usage/limit mapping (e.g., how usage/limits are mapped to sellable resources and plans). It should be appreciated that, in some embodiments, the models database may maintain multiple versions of the same connector and/or multiple connectors. Accordingly, it should be further appreciated that, in such embodiments in which multiple versions are maintained, the difference between versions (i.e., the changes) may be determined automatically (e.g., via a comparison of certain model information).

The connector builder 304 is configured to generate a schema file for all business objects associated with a connector. To do so, the connector builder 304 is configured to analyze metadata (e.g., connector description information) of the connector to identify the business objects and generate the scheme file. Additionally, the connector builder 304 is configured to generate a set of upgrade instructions in such embodiments in which the connector is not the first version of the connector (i.e., the connector being packaged is an upgrade or otherwise includes changes to a previously packaged connector for the same service). The upgrade instructions may include any model changes that can be tracked and applied to an upgraded version of the connector, such as changes to metadata of the connector, adding new properties in scope of type or assignment of a default value, removing properties, changing property names/types, adding services (e.g., a new object in the application domain model), adding new relations to/between objects of other connector or of the application domain model, renaming relations, changing relation cardinality or options, changing type required by relation, changing property access rules, changing relation access and/or assignment rules, splitting relations into more than one relations according to rules, etc.

The connector builder 304 is further configured to assemble the aforementioned generated schema and upgrade instructions, if applicable, along with source code of the connector, and frontend templates into a connector package. Furthermore, the connector builder 304 is configured to upload the assembled connector package to the available services database 110 of the marketplace computing device 102 that includes a catalogue of connectors (i.e., available services).

The library manager 306 is configured to manage the flow of data between the illustrative databases, which illustratively include a compatibility rules database 308, a connector skeleton database 310, and a frontend templates database 312. To do so, the library manager 306 is configured to perform read and write operations on each of the databases, as well as any other operations that may need to be performed on the data (e.g., standardizing the data, normalizing the data, enhancing the data, etc.).

The compatibility rules database 308 is configured to store rules for versioning management (i.e., compatibility rules). In other words, the compatibility rules ensure backwards compatibility between versions. For example, the compatibility rules do not allow a change to be made to the type of resources being sold, as backwards compatibility would be broken; however, the compatibility rules allow for expanding the configuration of that type of resources or additional types of resources to be sold. As such, the compatibility rules provide for the capability to allow for automatic upgrades to be performed, as the proposed upgrade can be tested against the compatibility rules (e.g., by the connector builder 304). It should be appreciated that there may be several sets of such rules. For example, a minor upgrade may maintain full backward compatibility, while a major upgrade may maintain limited backward compatibility.

The connector skeleton database 310 is configured to store code prepared according to model and best practices for connector development. As such, the stored code may be used as a starting framework for the development of the backend for a connector. It should be appreciated that the code may be customized depending on the model defined by the developer.

The frontend templates database 312 is configured to store user-interfaces for known scenarios (e.g., creation of a new customer/account, buying a subscription for a customer, disabling a subscription, terminating a subscription, etc.). Accordingly, when a developer enables a known scenario, UI code relevant to that scenario can be added to a UI component of the connector from the frontend templates database 312.

It should be appreciated that, in some embodiments, the data stored in the respective databases as described herein may not be mutually exclusive. In other words, certain data described herein as being stored in one database may additionally or alternatively be stored in another database described herein, or another database altogether. It should be further appreciated that, in some embodiments, the data may be stored in a single database, a distributed database, or an alternative database arrangement.

The connector player 314 is configured to run test scenarios of the connector against a test system (e.g., the test system 316). Such scenarios may include deploying the connector, creating connector instances, configuring service templates and plans, testing subscription/user creation, requesting usage for counter resources, etc. Accordingly, the test system 316 is configured to provide resources usable to test various scenarios of a connector. It should be appreciated that the resources may be physical and/or virtual resources.

The expert system 318 is configured to analyze potential pairing services and suggest one or more identified services as candidates to be paired with the service associated with the connector. To do so, the expert system 318 is configured to identify information associated with the connector (e.g., a service type, description, etc.) and compare the identified information with corresponding information of other services that are typically paired. In an illustrative example, the expert system 318 may suggest to pair an anti-spam service based on the results of analysis performed on a connector for an electronic mail service. It should be appreciated that any relations may change the associated connector model.

As described previously, the developer portal computing device 116 may be comprised of one or more computing devices 134. Accordingly, while the developer UI portal 118, the models database 302, the library manager 306, the connector builder 304, the connector player 314, the test system 316, and the expert system 318 are illustratively shown as residing on a single computing device 134 (i.e., the developer portal computing device 116), it should be appreciated that, in some embodiments, one or more components may be located on different computing devices 134, together comprising the developer portal computing device 116.

Referring now to FIGS. 4A-4D, an illustrative method 400 is provided for creating and distributing integration connectors in cloud service brokerage systems that may be performed by the developer portal computing device 116, or more particularly by one or more of the components of the developer portal computing device 116 (e.g., the developer UI portal 118, the connector builder 304, etc.). The method 400 begins in block 402, in which the developer portal computing device 116 determines whether to create a connector object. If so, the method 400 advances to block 404 in which the developer portal computing device 116 selects a relevant connector skeleton (e.g., from the connector skeleton database 310 of FIG. 3). As described previously, the connector skeleton may be in the form of code usable as a starting framework for the development of the backend for a connector.

In block 406, the developer portal computing device 116 generates a unique connector model identifier. In block 408, the developer portal computing device 116 requests (e.g., via the UI developer portal 118) connector description information for a connector model from a connector developer. In an illustrative example, in block 410, the developer portal computing device 116 requests UI information (e.g., a service title, a service type, an icons, etc.) and one or more provider instructions. As described previously, the connector description information may include any information related to the API connector that can be used for instantiating an instance of the API connector, such as resource model information (e.g., service(s) provided, such as disk space, mailboxes, domains, etc.), credentials for establishing the provisioning channel, service plan information (e.g., billing rules for the broker/provider), resource information.

In block 412, the developer portal computing device 116 determines whether the requested information has been received (e.g., via the UI developer portal 118). If so, the method 400 advances to block 414, in which the developer portal computing device 116 stores the received information (e.g., in the models database 302 of FIG. 3). In block 416, the developer portal computing device 116 notifies an expert system (e.g., the expert 318 system of FIG. 3) to perform a version analysis (see, e.g., the method 500 of FIG. 5). In other words, the developer portal computing device 116 notifies the expert system to analyze existing connectors (e.g., in the available services database 110 of the connector hub 106 of FIG. 1) for possible connectors which are previous versions of the connector object. In block 418, the developer portal computing device 116 determines whether the version analysis has been completed, such as may be determined upon receiving an indication from the expert system tasked with performing the version analysis.

Figure 4A:
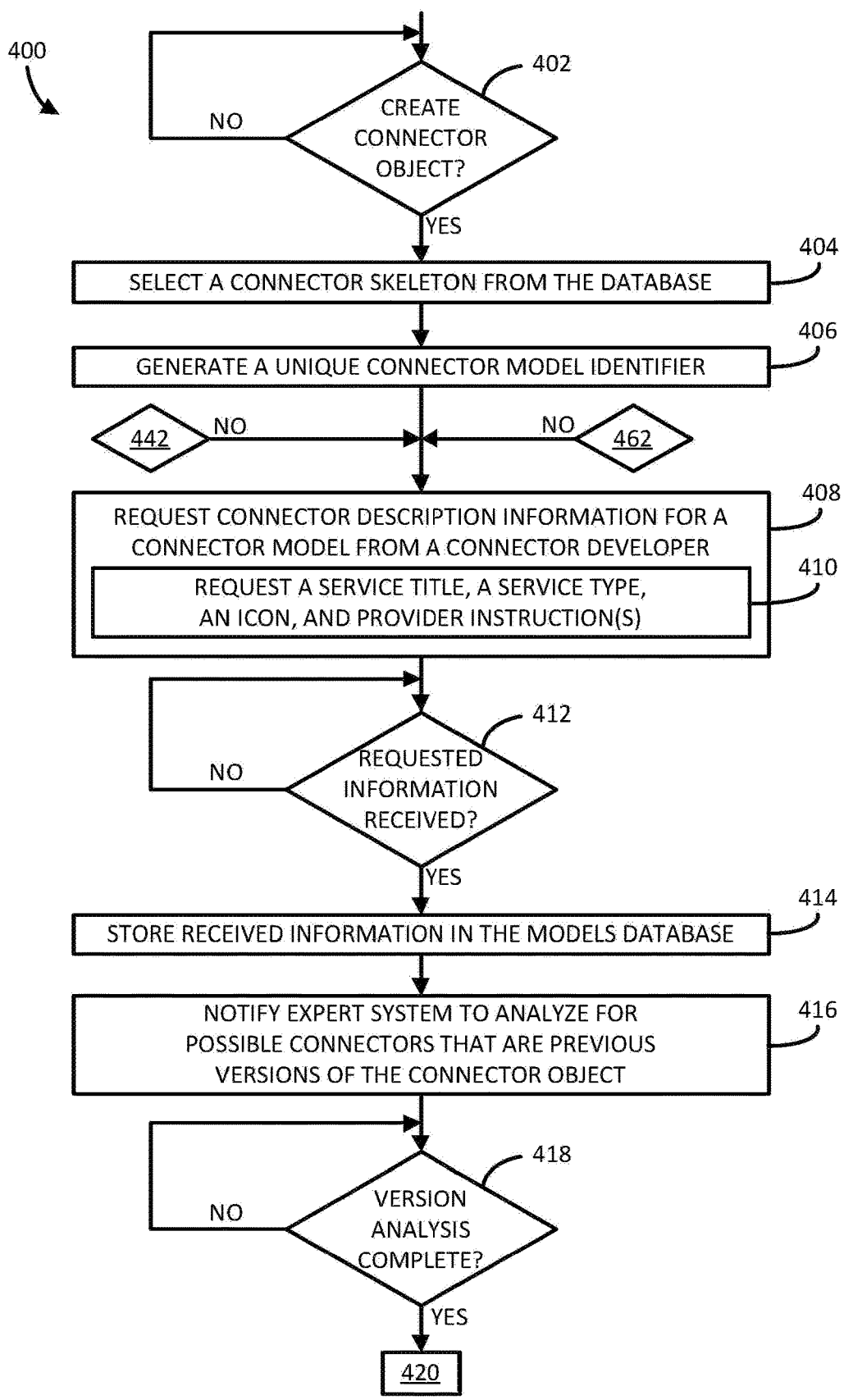
FIGS. 4A-4D are a schematic flow diagram of an illustrative method for creating and distributing integration connectors in cloud service brokerage systems that may be performed by the developer portal computing device of FIG. 1.
Figure 4B:
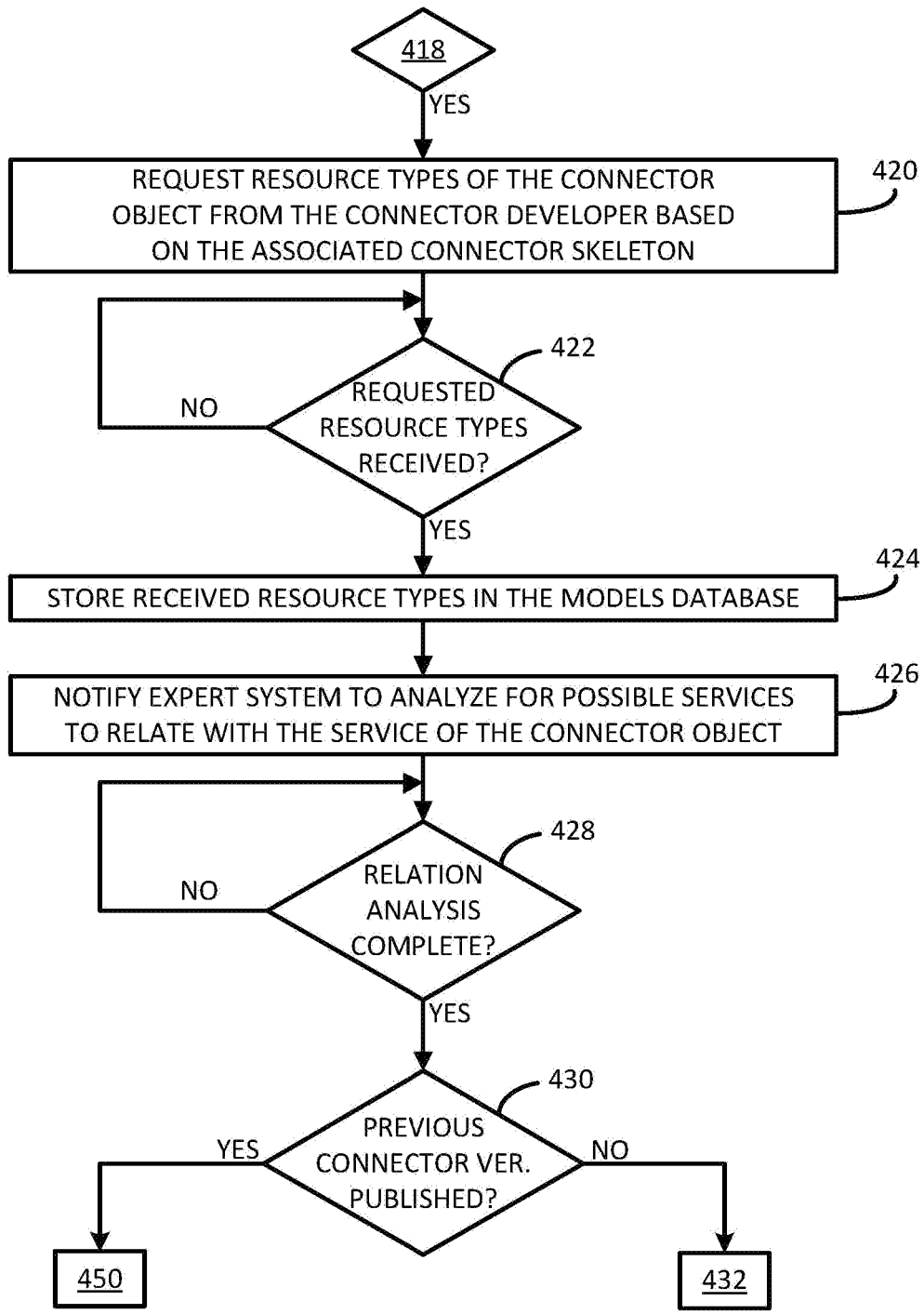

If the developer portal computing device 116 determines the version analysis has been completed, the method 400 advances to block 420, shown in FIG. 4B. In block 420, the developer portal computing device 116 requests to receive resource types of the connector object from the connector developer (e.g., via the UI developer portal 118) based on the associated connector skeleton selected by the connector developer in block 404. In block 422, the developer portal computing device 116 determines whether the requested resource types have been received. If so, the method 400 advances to block 424, in which the developer portal computing device 116 stores the received resource types in the models database (e.g., in the models database 302 of FIG. 3).

Figure 4C:
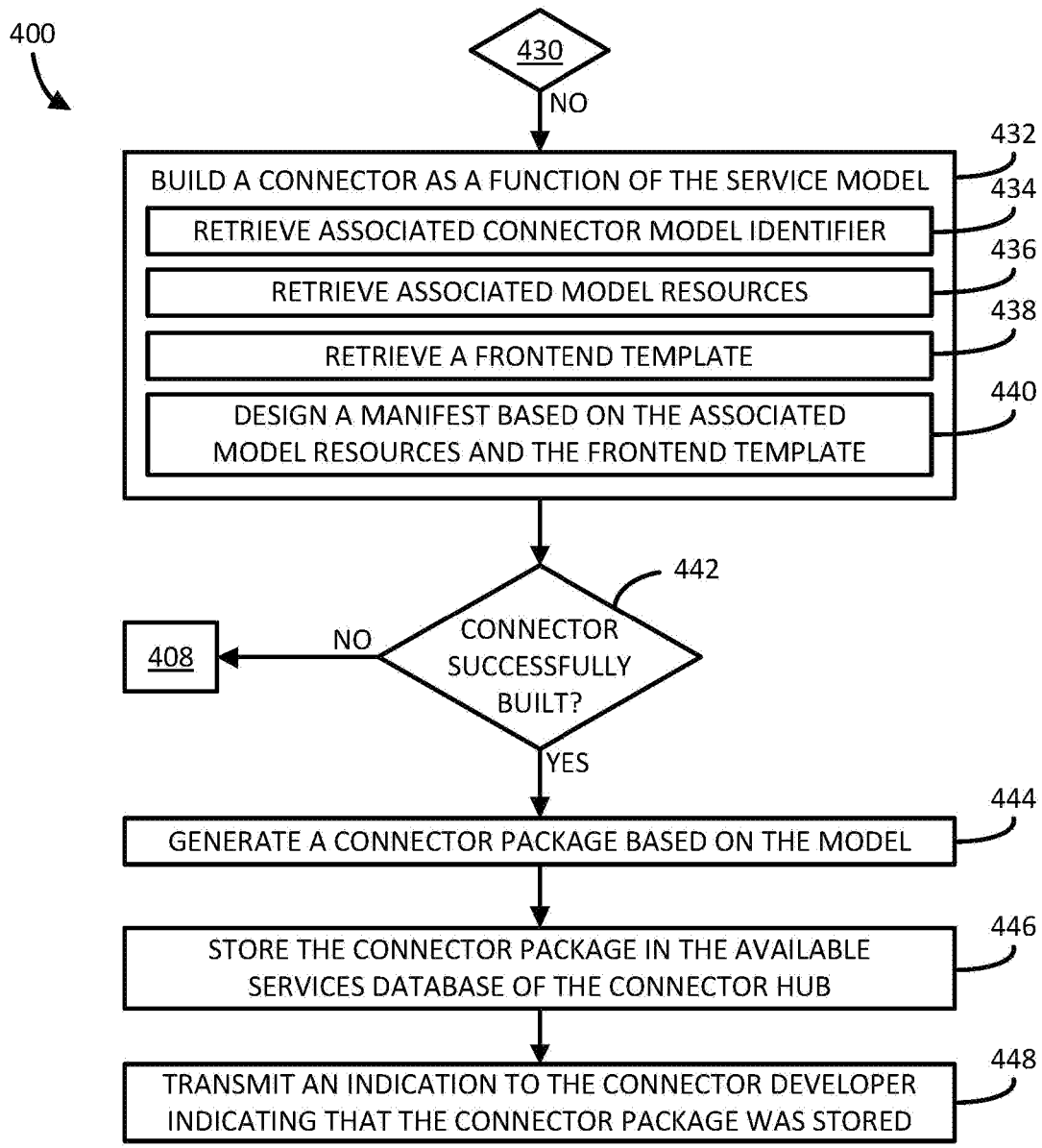
Figure 6:
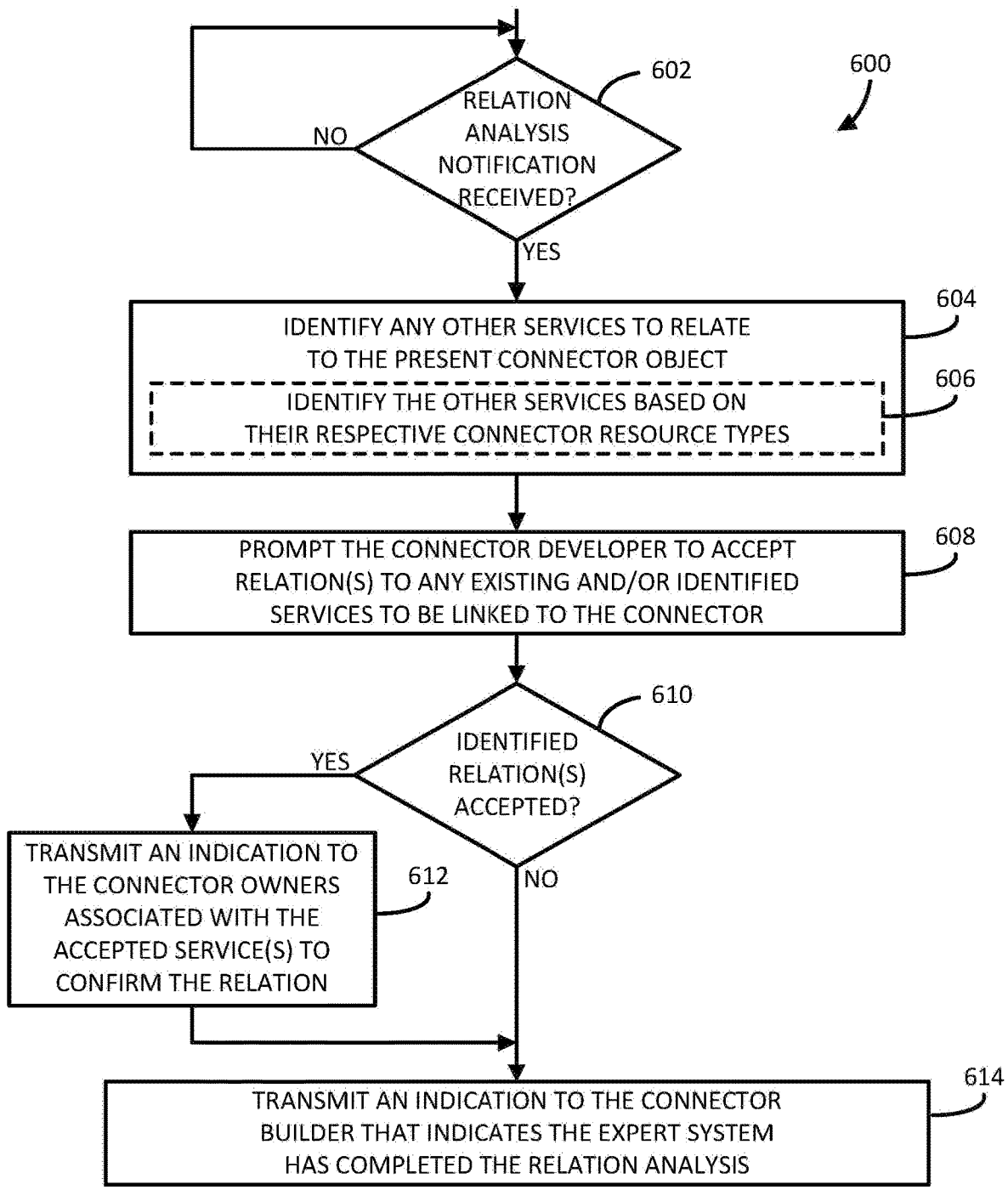
FIG. 6 is a schematic flow diagram of another illustrative method for performing a pairing analysis on connector objects that may be performed by the developer portal computing device of FIG. 1.

In block 426, the developer portal computing device 116 notifies the expert system (e.g., the expert system 318) to perform a relation analysis (see, e.g., the method 600 of FIG. 6). In other words, the developer portal computing device 116 notifies the expert system to analyze the connector object being created for possible services to relate with the service of the connector object. In block 428, the developer portal computing device 116 determines whether the relation analysis has been completed. If so, the method 400 branches to block 430, in which the developer portal computing device 116 determines, based on received information from the expert system 318 in block 418, whether the connector object has one or more corresponding version(s) of the connector object that have been published previously. If so, the method 400 branches to block 450, which is shown in FIG. 4D and described below; otherwise, the method 400 branches to block 432, which is shown in FIG. 4C.

In block 432, the developer portal computing device 116 builds a connector as a function of the service model. To do so, in block 434, the developer portal computing device 116 retrieves the associated connector model identifier generated in block 406. Additionally, in block 436, the developer portal computing device 116 retrieves the associated model resources. Further, in block 438, the developer portal computing device 116 retrieves a frontend template (e.g., user-interfaces for known scenarios). Further still, in block 440, the developer portal computing device 116 designs a manifest based on the retrieved associated model resources and frontend template.

In block 442, the developer portal computing device 116 determines whether the connector was successfully built. If not, the method 400 returns to block 408 to request additional and/or alternative connector description information; otherwise, the method 400 advances to block 444. In block 444, the developer portal computing device 116 generates a connector package based on the model. In block 446, the developer portal computing device 116 stores the connector package (e.g., in the available services database 110 of the connector hub 106 of FIG. 1). In block 448, the developer portal computing device 116 transmits an indication to the connector developer indicating that the connector package was stored.

Figure 4D:
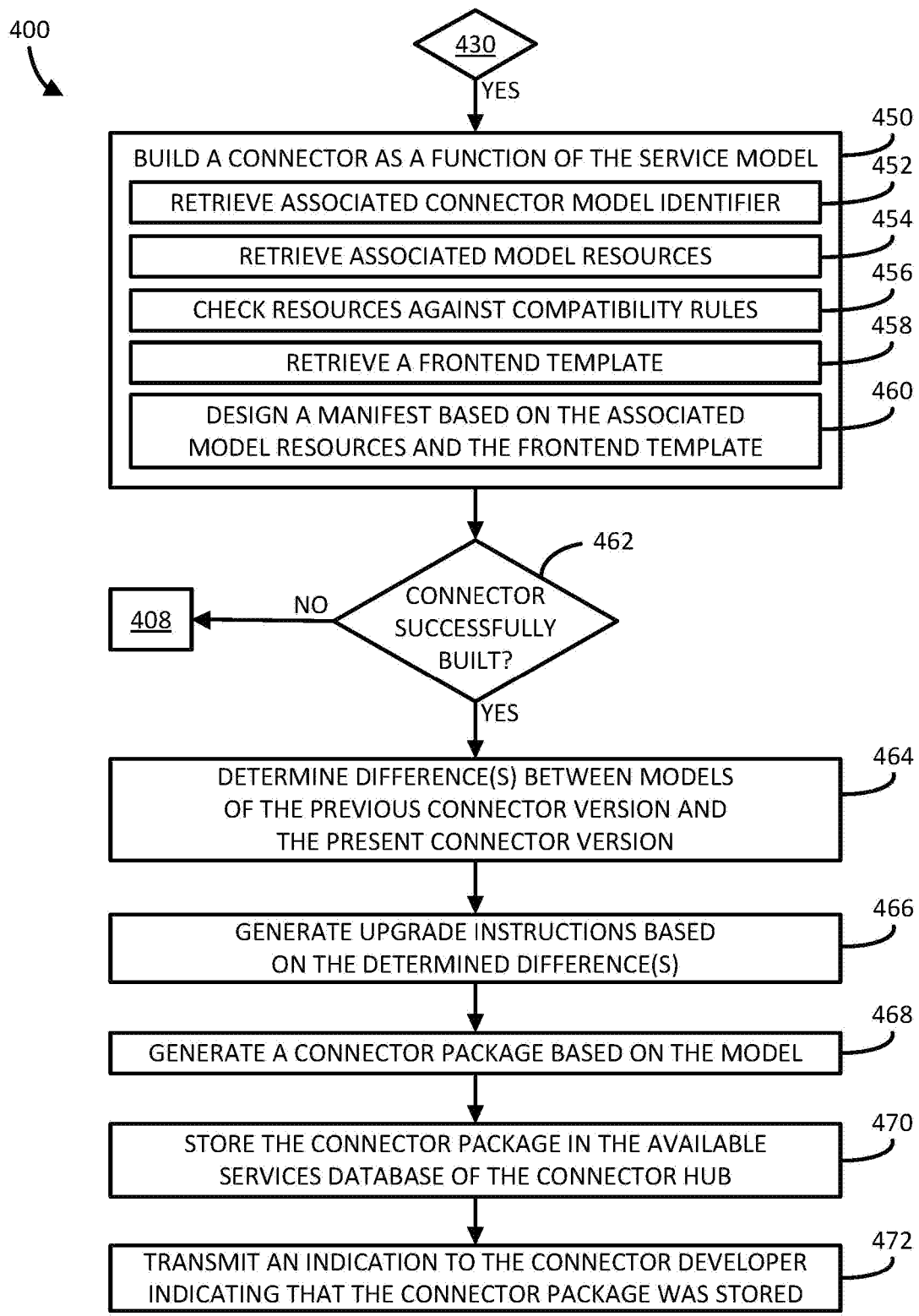

As described previously, in block 430 (shown in FIG. 4B), if the developer portal computing device 116 determines that the connector object has any previously published versions, the method 400 branches to block 450, which is shown in FIG. 4D. In block 450, the developer portal computing device 116 builds a connector as a function of the service model. To do so, in block 452, the developer portal computing device 116 retrieves the associated connector model identifier generated in block 406. Additionally, in block 454, the developer portal computing device 116 retrieves the associated model resources. Further, in block 456, the developer portal computing device 116 checks resources against any applicable compatibility rules to ensure backward compatibility for upgrades/changes made to a connector. As described previously, the compatibility rules provide for the capability to allow for automatic upgrades to be performed, as the proposed upgrade can be tested against the compatibility rules (e.g., as may be stored in the compatibility rules database 308). Further still, in block 458, the developer portal computing device 116 retrieves a frontend template (e.g., user-interfaces for known scenarios). Yet further still, in block 460, the developer portal computing device 116 designs a manifest based on the retrieved associated model resources and frontend template.

In block 462, the developer portal computing device 116 determines whether the connector was successfully built (e.g., if the resources violate any compatibility rules). If not, the method 400 returns to block 408 to request additional and/or alternative connector description information; otherwise, the method 400 advances to block 464. In block 464, the developer portal computing device 116 determines any differences between models of the previous connector version and the present connector version. In block 466, the developer portal computing device 116 generates one or more upgrade instructions based on the differences determined in block 464. As described previously, the upgrade instructions may include any model changes that can be tracked and applied to an upgraded version of the connector In block 468, the developer portal computing device 116 generates a connector package based on the model and the upgrade instructions. In block 470, the developer portal computing device 116 stores the connector package (e.g., in the available services database 110 of the connector hub 106 of FIG. 1). In block 472, the developer portal computing device 116 transmits an indication to the connector developer indicating that the connector package was stored.

Figure 5:
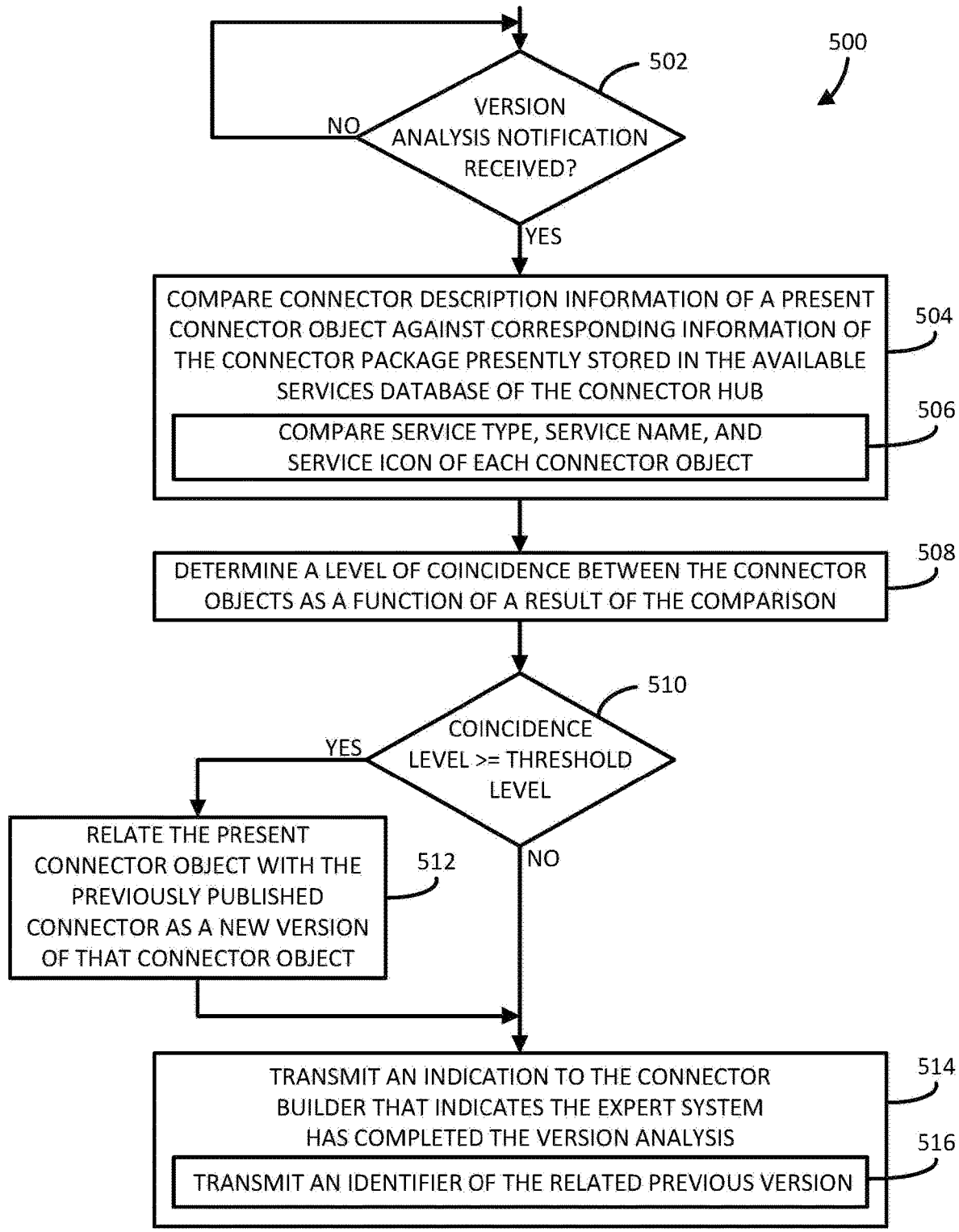
FIG. 5 is a schematic flow diagram of an illustrative method for performing a version analysis on connector objects that may be performed by the developer portal computing device of FIG. 1.

Referring now to FIG. 5, an illustrative method 500 is provided for performing a version analysis on connector objects that may be performed by the developer portal computing device 116, or more particularly by the expert system 318 of the developer portal computing device 116. The method 500 begins in block 502, in which the expert system 318 determines whether a version analysis notification was received (e.g., from a developer via the developer UI portal 118 of FIGS. 1 and 3).

In block 504, the expert system 318 compares connector description information of the present connector object being created against corresponding information of the connector package(s) presently stored in the available services database 110 of the connector hub 106 of FIG. 1, such as may be determined from the associated model (e.g., resource model information stored in the models database 302 of FIG. 3). As described previously, the connector description information may include any information related to the API connector that can be used for instantiating an instance of the API connector. In an illustrative example, in block 506, the expert system 318 compares a service type, a service name, and a service icon of each connector object.

In block 508, the expert system 318 determines a level of coincidence between the connector objects as a function of a result of the comparison performed in block 504. In block 510, the expert system 318 determines whether the coincidence level determined in block 508 is greater than or equal to a coincidence level threshold. The coincidence level may be any numerical value (e.g., amount, quantity, counter value, percentage, etc.) usable to convey a level of coincidence between information (e.g., the service type, the service name, the service icon, etc.) of each connector object. Accordingly, the coincidence level threshold may be defined as any corresponding amount usable to compare against the coincidence level to determine whether the coincidence level is high enough such that it can be reasonably determined that the connector objects are associated (i.e., one is a previous version of the other).

If the expert system 318 determines the coincidence level is greater than or equal to the coincidence level threshold, the method 500 branches to block 512 before advancing to block 514. In block 512, the expert system 318 relates the present connector object with the previously published connector as a new version of that connector object. If the expert system 318 determines the coincidence level is less than the coincidence level threshold, the method 500 branches to block 514, in which the expert system 318 transmits an indication to the connector builder (e.g., the connector builder 304 of FIG. 3) that indicates the expert system has completed the version analysis. In block 516, the expert system 318 transmits an identifier of the previous version of the connector object, as may be applicable (i.e., if the relation occurred in block 512).

Referring now to FIG. 6, an illustrative method 600 is provided for performing a pairing analysis on connector objects that may be performed by the developer portal computing device 116, or more particularly by the expert system 318 of the developer portal computing device 116. The method 600 begins in block 602, in which the expert system 318 determines whether a relation analysis notification was received (e.g., from a developer via the developer UI portal 118 of FIGS. 1 and 3). In block 604, the expert system 318 identifies any other services that could be related to the current connector object. To do so, in block 606, the expert system 318 may identify the other services based on information their connector packages stored in the available services database 110 of the connector hub 106, such as their respective connector resource types.

In block 608, the expert system 318 prompts the connector developer to accept the identified relation(s) to any existing and/or identified services to be linked to the connector. In block 610, the expert system 318 determines whether the relation(s) were accepted. It should be appreciated that, in some embodiments, some, all, or none of the identified relation(s) may be accepted. It should be further appreciated that, in some embodiments, the developer may not be prompted to accept the relations. In other words, in such embodiments, the relations may be identified and associated automatically, such that the method 600 advances directly from block 604 to block 612. If any of the identified relations were accepted in block 610, the method 600 advances block 612 before proceeding to block 614. In block 612, the expert system 318 transmits an indication to each of the connector owners associated with the accepted service(s) to confirm the relation. Otherwise, if any of the identified relations were not accepted in block 610, the method 600 advances block 614, in which the expert system 318 transmits an indication to the connector builder (e.g., the connector builder 304 of FIG. 3) that indicates the expert system has completed the relation analysis.

While the present disclosure has been illustrated and described in detail in the drawings and foregoing description, the same is to be considered as illustrative and not restrictive in character, it being understood that only certain embodiments have been shown and described, and that all changes and modifications that come within the spirit of the present disclosure are desired to be protected.

What is claimed is:

1. A method for creating and distributing Application Programming Interface (API) connectors in a cloud service brokerage system, the method comprising:

receiving, from a developer via a developer UI portal of a developer portal computing device, connector descriptor information for an API connector associated with a cloud service;

receiving, from the developer via the developer UI portal, one or more resource types of a model of the API connector;

building, via a connector builder of the developer portal computing device, the API connector based on a stored framework for development of a backend for the connector, wherein the API connector is built as a function of the connector descriptor information and the one or more resource types, wherein the framework comprises code configured to enable customization depending on a model defined by the developer;

analyzing, by an expert system of the developer portal computing device, whether a previous version of the API connector associated with the cloud service has been published;

determining, by the expert system and subsequent to a determination that the previous version of the API connector has been published, a coincidence level between the API connector and the previous version of the API connector;

comparing, by the expert system, the coincidence level against a coincidence level threshold; and relating, by the expert system, the API connector with the previous version of the API connector as a new version of the previous version of the API connector;

determining, by the connector builder, one or more differences between the API connector and the previous version of the API connector;

generating, by the connector builder, one or more upgrade instructions as a function of the determined one or more differences, wherein generating a connector package comprises generating the connector package as a function of the one or more upgrade instructions;

generating, by the connector builder, the connector package for the built API connector; and transmitting, by the connector builder, the generated connector package to a connector hub of a cloud service marketplace computing device, using the connector package to create one or more instances of the API connector.

2. The method of claim 1, further comprising:

analyzing, via the expert system of the developer portal computing device, whether another service should be related to the API connector;

identifying, by the expert system, whether one or more other services could be related to the API connector; and relating, by the expert system and subsequent to having identified the one or more other services could be related to the API connector, the one or more other services.

3. The method of claim 1, further comprising receiving, from the developer via the developer UI portal, an identifier associated with a connector skeleton from a connector skeleton database of the developer portal computing device, wherein the connector skeleton is usable to generate the framework for creating the connector, and wherein receiving the one or more resource types of the API connector comprises receiving the one or more resource types of the API connector based on the connector skeleton.

4. The method of claim 1, wherein receiving the connector descriptor information includes receiving a title of the service, a type of the service, an icon associated with the service, and one or more service provider instructions.

5. A method for creating and distributing cloud service integration connectors in a cloud service brokerage system, the method comprising:

receiving, from a developer via a developer UI portal of a developer portal computing device, connector descriptor information for a cloud service integration connector associated with a cloud service;

receiving, from the developer via the developer UI portal, one or more resource types of a model of the cloud service integration connector;

building, via a connector builder of the developer portal computing device, the cloud service integration connector based on a stored framework for development of a backend for the connector, wherein the cloud service integration connector is built as a function of the connector descriptor information and the one or more resource types, wherein the framework comprises code configured to enable customization depending on a model defined by the developer;

analyzing, by an expert system of the developer portal computing device, whether a previous version of the cloud service integration connector associated with the cloud service has been published;

determining, by the expert system and subsequent to a determination that the previous version of the cloud service integration connector has been published, a coincidence level between the cloud service integration connector and the previous version of the cloud service integration connector;

comparing, by the expert system, the coincidence level against a coincidence level threshold; and relating, by the expert system, the cloud service integration connector with the previous version of the cloud service integration connector as a new version of the previous version of the cloud service integration connector;

determining, by the connector builder, one or more differences between the cloud service integration connector and the previous version of the cloud service integration connector; and generating, by the connector builder, one or more upgrade instructions as a function of the determined one or more differences, wherein generating a cloud service integration connector package comprises generating the cloud service integration connector package as a function of the one or more upgrade instructions;

generating, by the connector builder, the cloud service integration connector package for the built cloud service integration connector; and transmitting, by the connector builder, the generated cloud service integration connector package to a connector hub of a cloud service marketplace computing device, using the cloud service integration connector package to create one or more instances of the cloud service integration connector, wherein the cloud service integration connector comprises an Application Programming Interface (API) connector.

6. The method of claim 5, further comprising:

analyzing, via the expert system of the developer portal computing device, whether another service should be related to the cloud service integration connector;

identifying, by the expert system, whether one or more other services could be related to the cloud service integration connector; and relating, by the expert system and subsequent to having identified the one or more other services could be related to the cloud service integration connector, the one or more other services.

7. The method of claim 5, further comprising receiving, from the developer via the developer UI portal, an identifier associated with a connector skeleton from a connector skeleton database of the developer portal computing device, wherein the connector skeleton is usable to generate the framework for creating the cloud service integration connector, and wherein receiving the one or more resource types of the cloud service integration connector comprises receiving the one or more resource types of the cloud service integration connector based on the connector skeleton.

8. The method of claim 5, wherein receiving the connector descriptor information includes receiving a title of the service, a type of the service, an icon associated with the service, and one or more service provider instructions.

* * * * *